(12) United States Patent
Sasaki et al.

(10) Patent No.: US 8,518,255 B2
(45) Date of Patent: Aug. 27, 2013

(54) WATER PURIFIER

(75) Inventors: Tsutomu Sasaki, Shiga (JP); Satoshi Sasaki, Shiga (JP)

(73) Assignee: Basic Co., Ltd., Shiga (JP)

( * ) Notice: Subject to any disclaimer, the term of this patent is extended or adjusted under 35 U.S.C. 154(b) by 327 days.

(21) Appl. No.: 13/080,757

(22) Filed: Apr. 6, 2011

(65) Prior Publication Data
US 2012/0255895 A1 Oct. 11, 2012

(51) Int. Cl.
*B01D 29/66* (2006.01)

(52) U.S. Cl.
USPC ............ 210/313; 210/335; 210/425; 210/449

(58) Field of Classification Search
USPC .................. 210/275, 278, 313, 335, 339, 420, 210/425, 426, 427, 446, 449
See application file for complete search history.

(56) References Cited

U.S. PATENT DOCUMENTS

| | | | | |
|---|---|---|---|---|
| 2,087,887 | A | * | 7/1937 | Gesner ........................ 210/278 |
| 4,351,727 | A | * | 9/1982 | Brogger ....................... 210/411 |
| 5,192,436 | A | | 3/1993 | Sasaki et al. |

* cited by examiner

*Primary Examiner* — Matthew O Savage

(74) *Attorney, Agent, or Firm* — Keating & Bennett, LLP

(57) ABSTRACT

A water purifier that performs back washing extremely effectively even when raw water contains a large amount of impurities includes an attachment main body including an inflow passage into which raw water from an inflow port flows, and first and second outflow passages through which water flows toward outflow ports; and a water purification main body that is attached rotatably to the attachment main body and includes a first flow passage, a second flow passage, and a third flow passage, a first filter member disposed between the first flow passage and the second flow passage and a second filter member disposed between the second flow passage and the third flow passage, wherein, when the attachment main body and the water purification main body are in a rotation position corresponding to a water purification mode, the first flow passage and the second flow passage communicate with the inflow passage and the first outflow passage, respectively, and when the attachment main body and the water purification main body are in a rotation position corresponding to a back washing mode, the third flow passage and the first flow passage communicate with the inflow passage and the second outflow passage, respectively, whereby the first filter member is back washed.

15 Claims, 14 Drawing Sheets

WATER PURIFIER

BACKGROUND OF THE INVENTION

1. Field of the Invention

The present invention relates to a water purifier that is capable of purifying service water (raw water) through a filter and cleaning (back washing) a filter member by passing service water (raw water) through the filter member from an opposite direction.

2. Description of the Related Art

Household water purifiers are widely used to purify raw water through a filter member while directly coupled to a bibcock (a faucet) of a water line. The filter member generates purified water by trapping impurities such as inorganic particles and bacteria contained in the raw water.

Various water purifiers have been proposed in the related art, and the present applicant has also filed a series of patent applications using a constitution described in U.S. Pat. No. 5,192,436 as a basic constitution. FIG. 12 shows a water purifier 101 having a similar basic constitution to that described in U.S. Pat. No. 5,192,436. The water purifier 101 includes an attachment main body 110 attached to a bibcock F of a water line, and a water purification main body 120 that is attached rotatably to the attachment main body 110 to be capable of purifying raw water from the water line into purified water by filtering the raw water. An inflow port 111 to which the bibcock F is coupled so that the raw water flows therein and a purified water outflow port 112 from which the purified water flows are provided on an upper side and a lower side of the attachment main body 110, respectively, while an inflow passage P111 and a purified water outflow passage P112 are provided in the attachment main body 110 to communicate with the inflow port 111 and the purified water outflow port 112, respectively. The water purification main body 120 is constituted by a water purification portion 120A in which a partition wall member 127 packed with a filter member 125 is disposed, and a valve portion 120B that is inserted into and rotatably attached to an attachment hole portion 115 provided in the attachment main body 110. A first flow passage P121 and a second flow passage P122 are provided in the water purification main body 120.

When purified water is caused to flow out of the purified water outflow port 112 (to be referred to hereafter as a water purification mode) in the water purifier 101, the inflow passage P111 and the purified water outflow passage P112 of the attachment main body 110 communicate respectively with the first flow passage P121 and the second flow passage P122 of the water purification main body 120. Further, when the filter member 125 is cleaned, the water purification main body 120 is rotated 180 degrees relative to the attachment main body 110 such that the inflow passage P111 and the purified water outflow passage P112 of the attachment main body 110 communicate respectively with the second flow passage P122 and the first flow passage P121 of the water purification main body 120, whereby waste water flows out from the purified water outflow port 112. Hence, by rotating the water purification main body 120 relative to the attachment main body 110, a water flow path is switched such that water is passed through the water purifier 101 in an opposite direction to the water purification mode, and as a result, the filter member 125 can be cleaned. Thus, a purification capacity of the water purifier 101 can be maintained. Note that cleaning the filter member by passing water through the filter member in an opposite direction to the water purification mode will be referred to hereafter as back washing, and a back washing operation will be referred to as a back washing mode.

However, the water quality of raw water from a water line differs from region to region, and depending on the raw water, impurities may become trapped and adhered to a side where impurities are not normally trapped during back washing of the filter member. From a worldwide viewpoint, differences in the water quality of raw water from region to region are extremely great.

SUMMARY OF THE INVENTION

In consideration of these circumstances, preferred embodiments of the present invention provide a water purifier that can perform back washing extremely effectively even when raw water contains a large amount of impurities.

A water purifier according to a preferred embodiment of the present invention includes an attachment main body that is attached to a bibcock of a water line and includes an inflow port, at least one outflow port, an inflow passage into which raw water from the inflow port flows, and first and second outflow passages through each of which water flows toward one of the at least one outflow port; and a water purification main body that is attached rotatably to the attachment main body and includes a first flow passage, a second flow passage, and a third flow passage, a first filter member disposed between the first flow passage and the second flow passage and a second filter member disposed between the second flow passage and the third flow passage, wherein, when the attachment main body and the water purification main body are in a rotation position corresponding to a water purification mode, the first flow passage and the second flow passage communicate with the inflow passage and the first outflow passage, respectively, whereby water flows in a direction of the first flow passage, the first filter member, and the second flow passage such that purified water flows out through one of the at least one outflow port, and when the attachment main body and the water purification main body are in a rotation position corresponding to a back washing mode, the third flow passage and the first flow passage communicate with the inflow passage and the second outflow passage, respectively, whereby water flows in a direction of the third flow passage, the second filter member, the second flow passage, the first filter member, and the first flow passage such that water used for back washing flows out through one of the at least one outflow port.

Preferably, an attachment hole portion is provided in the attachment main body as a recess, a valve portion is provided on the water purification main body as a projection, respective opening portions of the first flow passage, the third flow passage, and the second flow passage being provided in a side surface of the valve portion in that order, and the valve portion is inserted into the attachment hole portion and attached thereto rotatably.

Preferably, the attachment main body includes a third outflow passage, the water purification main body includes a fourth flow passage, respective opening portions of the first flow passage, the third flow passage, the second flow passage, and the fourth flow passage being provided in the side surface of the valve portion in that order, and when the attachment main body and the water purification main body are in a rotation position corresponding to a raw water mode, which is in an opposite direction to a direction of the rotation position corresponding to the back washing mode relative to the rotation position corresponding to the water purification mode, the inflow passage communicates with the third outflow passage via the fourth flow passage.

Preferably, a drain purge valve capable of discharging water in the third flow passage to the outside is provided in the water purification main body.

According to a preferred embodiment of the present invention, by rotating the water purification main body relative to the attachment main body, a water path through the water purifier is varied such that in the water purification mode for causing purified water to flow to the outside, raw water is passed through the first filter member to produce purified water, and in the back washing mode for back washing the first filter member, back washing is performed by passing raw water through the second filter member to form purified water and then passing the purified water through the first filter member in an opposite direction to that of the water purification mode. Hence, even when the raw water contains a large amount of impurities, the first filter member can be back washed extremely effectively.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
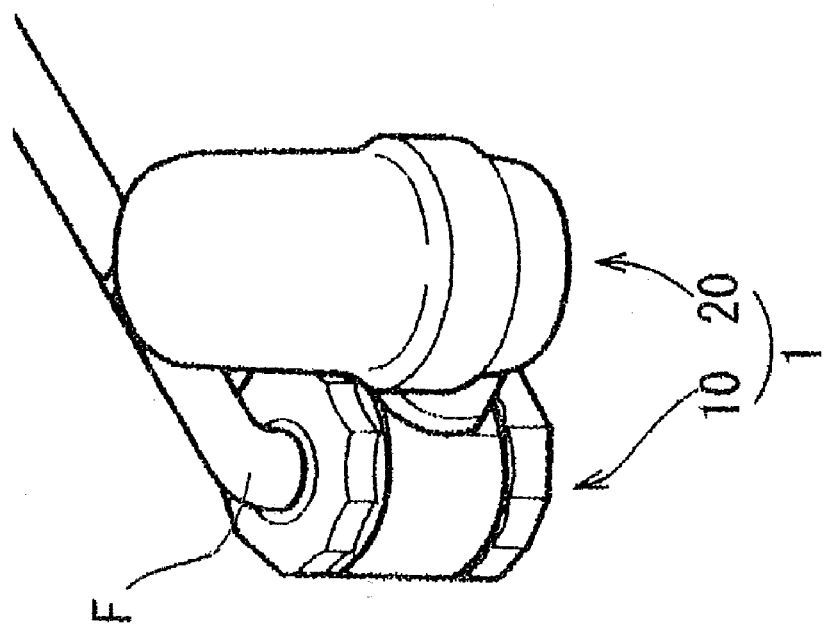
FIG. 1A is a perspective view showing a water purifier 1 in a water purification mode according to a preferred embodiment of the present invention.
Figure 1B:
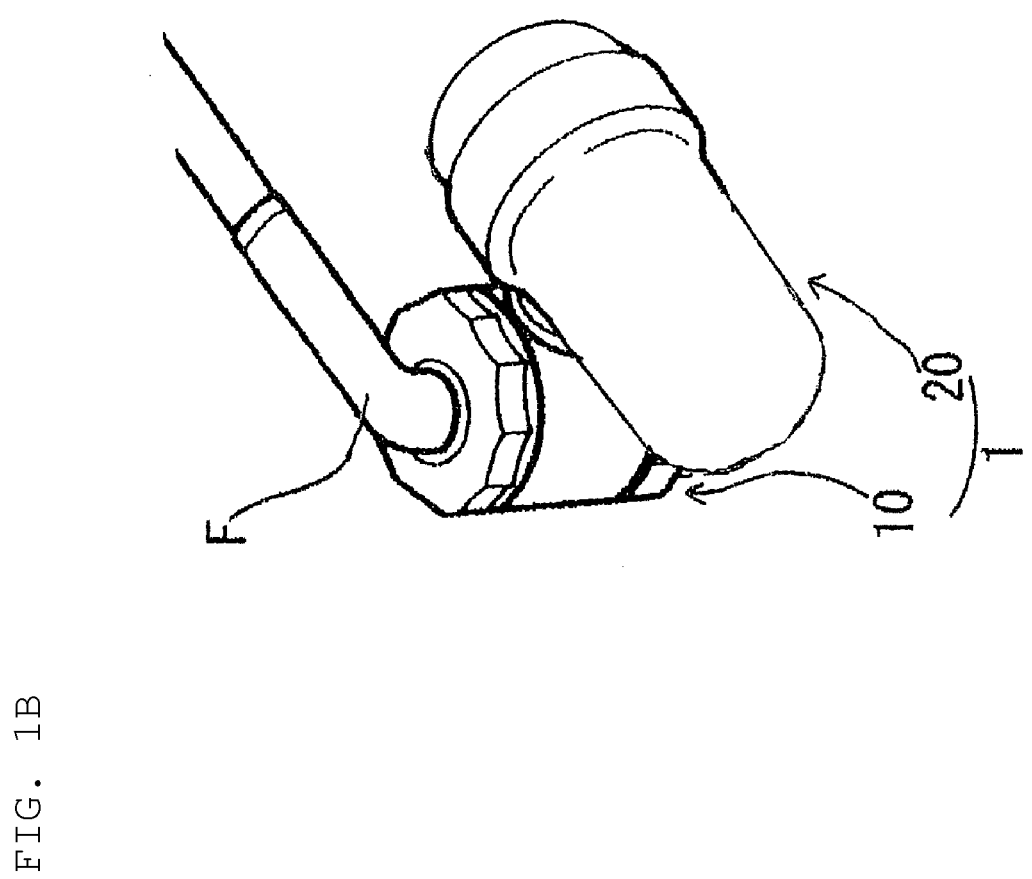
FIG. 1B is a perspective view showing the water purifier 1 in a back washing mode.
Figure 1C:
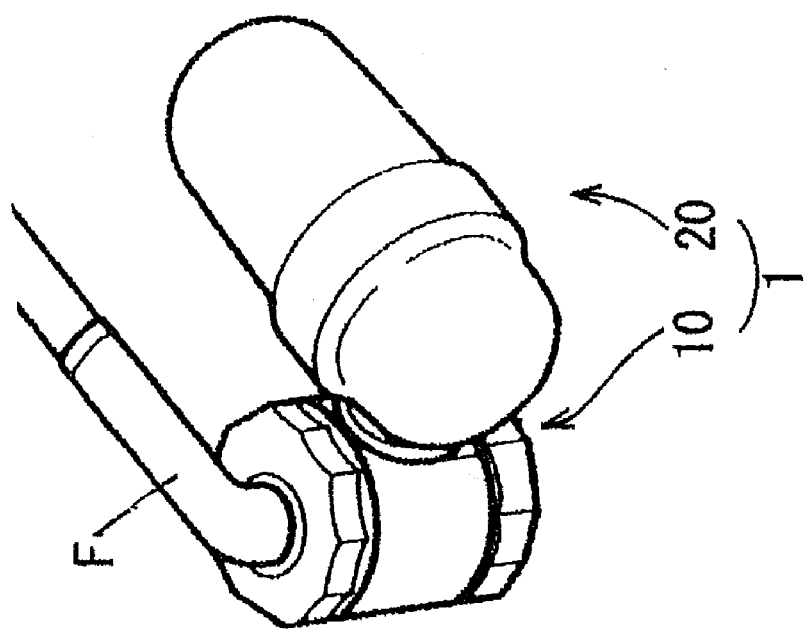
FIG. 1C is a perspective view showing the water purifier 1 in a raw water mode.

Preferred embodiments of the present invention will be described below with reference to the drawings. As shown in FIGS. 1A, 1B, and 1C, a water purifier 1 according to a preferred embodiment of the present invention includes an attachment main body 10 attached to a bibcock (a faucet) F of a water line, and a water purification main body 20 that is capable of purifying raw water from the water line into purified water by filtering the raw water. In the water purifier 1, the water purification main body 20 is attached to the attachment main body 10 rotatably, and in accordance with a rotation position of the water purification main body 20 relative to the attachment main body 10, the water purifier 1 can be switched between a water purification mode in which purified water is caused to flow, a back washing mode for back washing a first filter member 25, to be described below, used in the water purification mode, and a raw water mode in which raw water is allowed to flow out as is. FIGS. 1A, 1B, and 1C show the water purification mode, the back washing mode, and the raw water mode, respectively.

Figure 2:
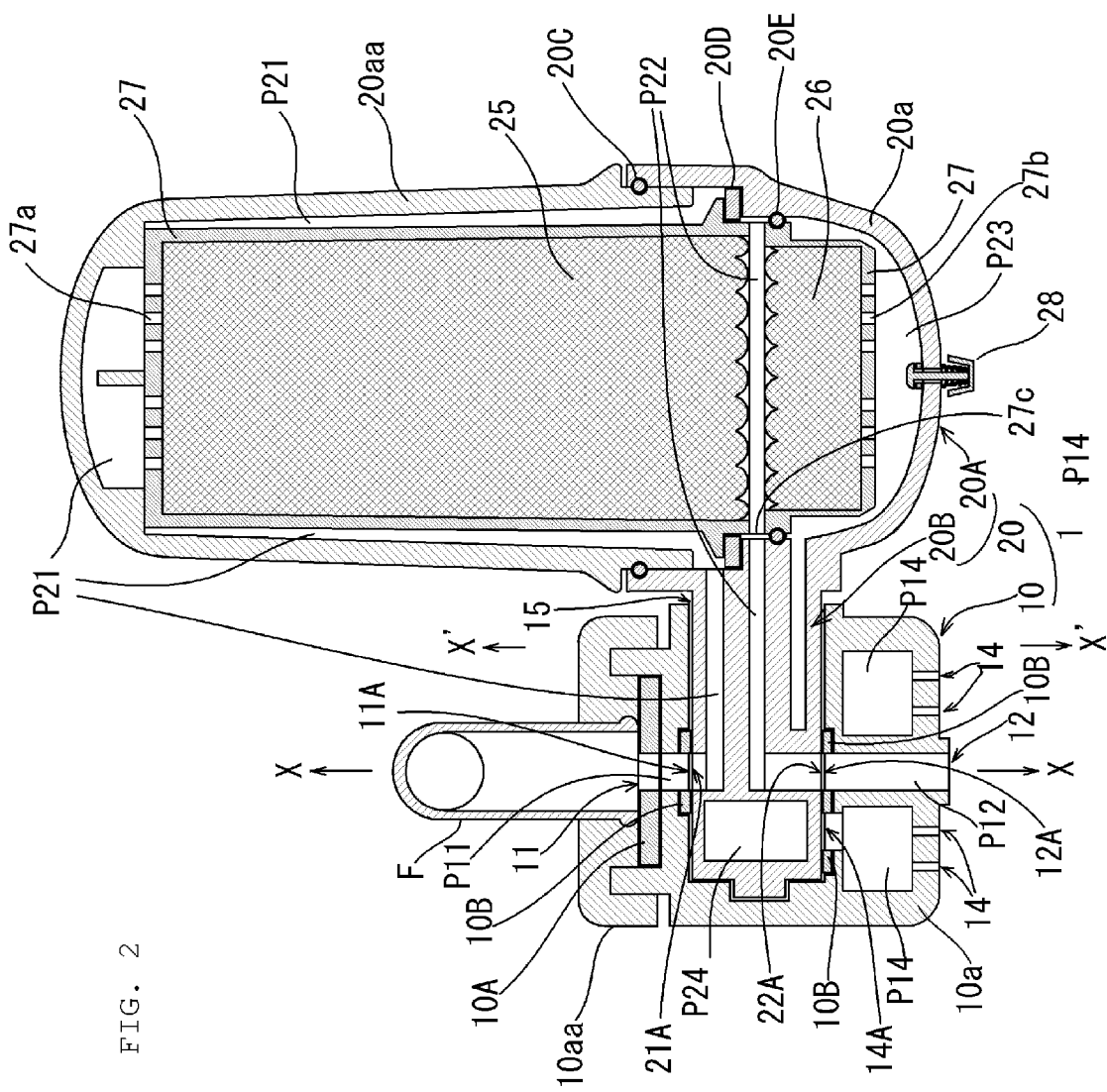
FIG. 2 is a front sectional view showing the water purifier 1 in the water purification mode.
Figure 3:
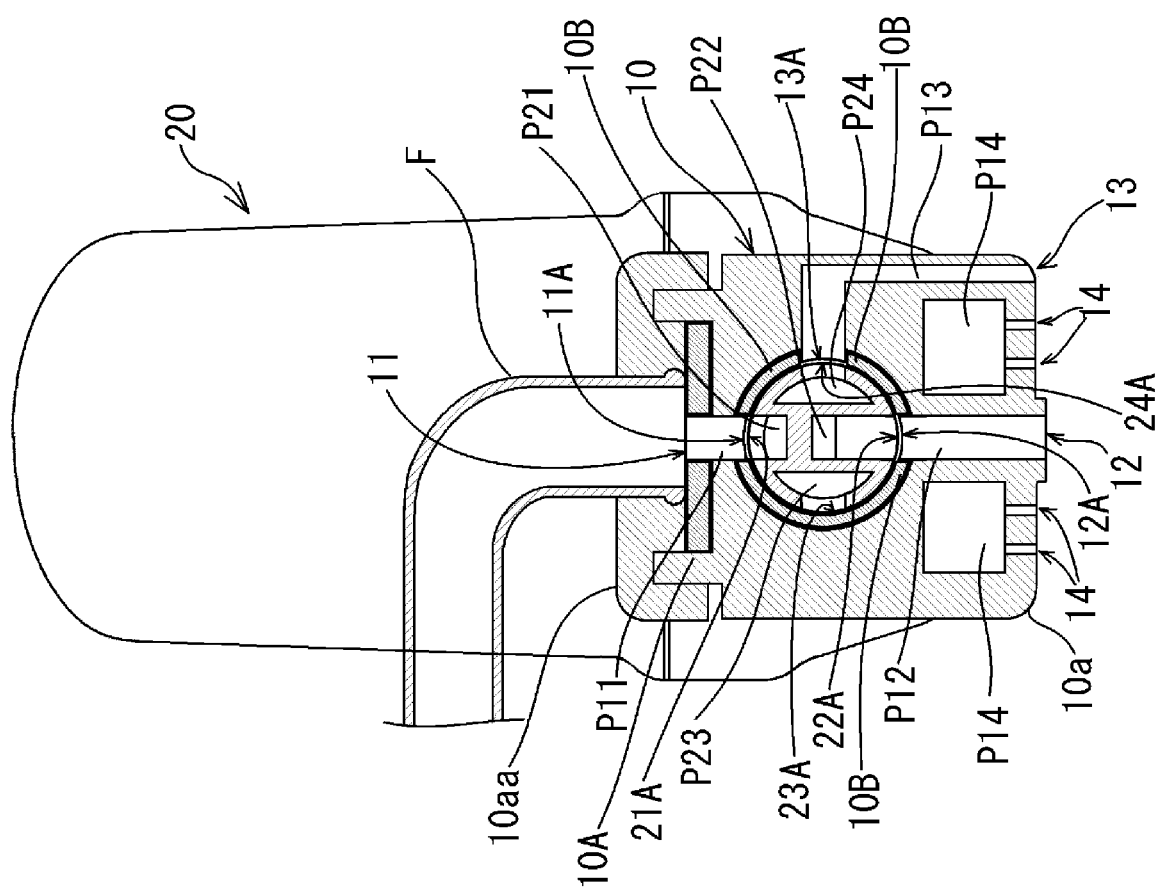
FIG. 3 is a left side sectional view taken in an X-X position in FIG. 2 and showing the water purifier 1 in the water purification mode.

As shown in FIGS. 2 and 3, the attachment main body 10 is attached to the bibcock F of the water line. In this preferred embodiment, the attachment main body 10 is attached by sandwiching (gripping) an end portion of the bibcock F between an attachment cover 10aa and a rubber packing member 10A. The attachment cover 10aa is a separable upper portion of an attachment main body base member 10a (a plastic member, for example) defining an outer contour of the attachment main body 10. The rubber packing member 10A is an elastic ring-shaped member for preventing leakage, which is fitted to an upper side central portion of the attachment main body base member 10a. An inflow port 11 to be described below is provided in the center of the rubber packing member 10A.

Figure 4:
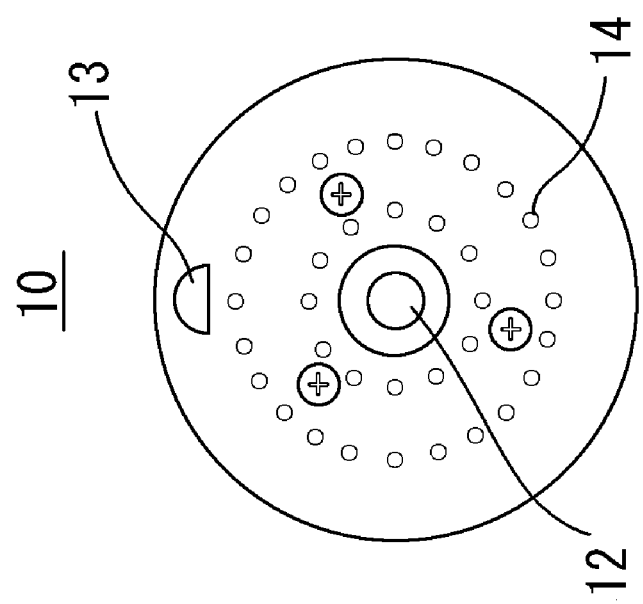
FIG. 4 is a bottom view showing an end surface of the water purifier 1 in which an outflow port is provided.

The inflow port 11 into which raw water flows from above, and lower side outflow ports 12, 13, 14 from which three types of water flow are provided in the attachment main body 10. More specifically, the outflow ports 12, 13, 14 are constituted by a purified water outflow port 12 from which purified water flows, a waste water outflow port 13 from which waste water flows during back washing of the first filter member 25, to be described below, and a raw water outflow port 14 from which raw water flows as is (see FIG. 4). In this preferred embodiment, the purified water outflow port 12 is constituted by a single hole in the center of an end surface, the raw water outflow port 14 is constituted by a large number of small holes provided on the periphery of the purified water outflow port 12 such that the raw water flows out in a shower, and the waste water outflow port 13 is constituted by a single hole on an outer side of the raw water outflow port 14.

An inflow passage P11 into which the raw water flows from the inflow port 11, and three outflow passages P12, P13, P14 through which water flows toward the outflow ports 12, 13, 14 are provided separately in the interior of the attachment main body 10. More specifically, the three outflow passages P12, P13, P14 are constituted by a purified water outflow passage (a first outflow passage) P12 communicating with the purified water outflow port 12, a waste water outflow passage (a second outflow passage) P13 communicating with the waste water outflow port 13, and a raw water outflow passage (a third outflow passage) P14 communicating with the raw water outflow port 14. Note that in FIGS. 2 and 3, a continuous lower portion of the ring-shaped raw water outflow passage P14 is shown in divided form.

An attachment hole portion 15 is formed (as a recess) in the attachment main body 10 so that a valve portion 20B, to be described below, of the water purification main body 20 can be inserted therein and attached rotatably. An inflow passage opening 11A provided on the opposite side end to the inflow port 11 of the inflow passage P11, a purified water outflow passage opening 12A provided on the opposite side end to the purified water outflow port 12 of the purified water outflow passage P12, and a waste water outflow passage opening 13A provided on the opposite side end to the waste water outflow port 13 of the waste water outflow passage P13 are formed on an identical circumference of an inner peripheral surface in which the attachment hole portion 15 is formed. A raw water outflow passage opening 14A on an opposite side end to the raw water outflow port 14 of the raw water outflow passage P14 is formed further toward a bottom surface side of the attachment hole portion 15 than the purified water outflow passage opening 12A in the inner peripheral surface. The inflow passage opening 11A, the waste water outflow passage opening 13A, and the purified water outflow passage opening 12A are formed clockwise (from the left side) in that order. To prevent leakage, the inflow passage opening 11A, the purified water outflow passage opening 12A, the waste water outflow passage opening 13A, and the raw water outflow passage opening 14A are surrounded by a rubber packing member 10B fitted into an recess portion having a predetermined shape in the attachment main body base member 10a. The rubber packing member 10B may be integral or divided appropriately.

As shown in FIGS. 2 and 3, the water purification main body 20 includes a first flow passage P21, a second flow passage P22, and a third flow passage P23, which are partitioned from each other. The first filter member 25 is disposed between the first flow passage P21 and the second flow passage P22, and a second filter member 26 is disposed between the second flow passage P22 and the third flow passage P23. A portion of the water purification main body 20 in which the first filter member 25 and second filter member 26 are disposed serves as a water purification portion 20A. Further, a portion of the water purification main body 20 that is inserted into the attachment hole portion 15 of the attachment main body 10 and attached rotatably thereto defines a valve portion 20B. There are no particular limitations on the material of the first filter member 25 and second filter member 26, but a hollow fiber membrane, a flat sheet membrane, a ceramic membrane, an active carbon filter, a laminated filter, a yarn wound filter, a metal filter, and so on may be used, for example.

More specifically, in the water purification main body 20, the water purification portion 20A is substantially cylindrical, while the valve portion 20B is substantially columnar and smaller than the water purification portion 20A, the valve portion 20B taking a (projecting) outer form that extends in a perpendicular or substantially perpendicular direction to an axis of the water purification portion 20A from a side surface near a lower end portion of the water purification portion 20A. In the water purification portion 20A, a water purification main body base member 20a (a plastic member, for example) defining an outer contour of the water purification main body 20 has a hollow interior so that a water purification cartridge including the first filter member 25 and second filter member 26 can be inserted and removed, and includes a separable lid part 20aa roughly provided on an upper side of a base end of the valve portion 20B. To prevent leakage, a rubber packing member (an O ring) 20C is fitted into a joint portion of the lid part 20aa in the water purification main body base member 20a. The water purification cartridge is preferably formed by packing the first filter member 25 and the second filter member 26 into the interior of a partition wall member 27 (a plastic member, for example) defining an outer contour thereof.

Specifically, the partition wall member 27 has a substantially cylindrical outer shape. The first filter member 25 and the second filter member 26 are packed into an upper end portion side and a lower end portion side of the partition wall member 27 in series in an axial direction, and the second flow passage P22 is located therebetween. The first flow passage P21 is located roughly on the upper side of the base end of the valve portion 20B between the partition wall member 27 and an inner wall of the water purification main body base member 20a (including 20aa), and to prevent leakage into the second flow passage P22, a rubber packing member (an O ring) 20D is fitted below the first flow passage P21. Further, the third flow passage P23 is located roughly on a lower side of the base end of the valve portion 20B between the partition wall member 27 and the inner wall of the water purification main body base member 20a, and to prevent leakage into the second flow passage P22, a rubber packing member (an O ring) 20E is fitted above the third flow passage P23. A communication hole 27a that communicates with the first flow passage P21, a communication hole 27b that communicates with the third flow passage P23, and a communication hole 27c that connects the second flow passage P22 on the exterior and in the interior of the partition wall member 27 are located in the upper end portion, the lower end portion, and a side portion of the partition wall member 27, respectively. A drain purge valve 28 is provided in a lower end portion of the water purification main body base member 20a, as will be described below.

In the valve portion 20B, the first flow passage P21, second flow passage P22, and third flow passage P23 are provided in the interior of the water purification main body base member 20a to extend from the water purification portion 20A, and a first flow passage opening 21A, a second flow passage opening 22A, and a third flow passage opening 23A serving as respective opening portions thereof are provided on an identical circumference in a side surface of the valve portion 20B. Further, a fourth flow passage P24 that serves as a bypass for connecting the inflow passage P11 of the attachment main body 10 to the raw water outflow passage P14 in the raw water mode is provided in the valve portion 20B. A first fourth flow passage opening 24A serving as an opening portion thereof is formed in the side surface of the valve portion 20B on an identical circumference to the first flow passage opening 21A, second flow passage opening 22A, and third flow passage opening 23A, and a second fourth flow passage opening 24B is formed in the side surface further toward a tip end surface side of the valve portion 20B than the third flow passage opening 23A (see FIG. 9). The first flow passage opening 21A, the third flow passage opening 23A, the second flow passage opening 22A, and the first fourth flow passage opening 24A are arranged counter-clockwise (from the left side) in that order.

Figure 5:
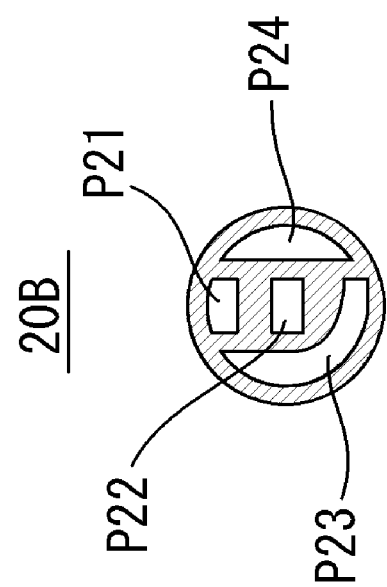
FIG. 5 is a left side cut-away end view taken in an X'-X' position in FIG. 2 and showing a valve portion 20B of the water purifier 1 in the water purification mode.

In this preferred embodiment, the first flow passage P21 extends in the axial direction of the valve portion 20B from an upper portion of the base end of the valve portion 20B, bends toward an upper side, and communicates with the first flow passage opening 21A at its tip. The second flow passage P22 extends in the axial direction from a central portion of the base end of the valve portion 20B, bends toward a lower side in an identical axial direction position and an opposite direction to the first flow passage P21, and communicates with the second flow passage opening 22A at its tip. The third flow passage P23 extends in the axial direction from a lower portion of the base end of the valve portion 20B while increasing in size in a circumferential direction, whereupon an enlarged portion on a back portion side thereof extends further in the axial direction, bends in an identical axial direction position and a perpendicular or substantially perpendicular direction to the first flow passage P21 and second flow passage P22, and communicates with the third flow passage opening 23A at its tip. In other words, in an X'-X' position of FIG. 2, the third flow passage P23 extends from the lower portion side to the back portion side, as shown in FIG. 5, whereas in the vicinity of the third flow passage opening 23A, as shown in FIG. 3, the third flow passage P23 is provided only on the back portion side. The fourth flow passage P24 is located further toward the tip end surface side of the valve portion 20B than the first flow passage P21, second flow passage P22, and third flow passage P23. Note that a projecting portion is provided on the tip end surface of the valve portion 20B, and this projecting portion is fitted lightly into an indentation provided in the center of a bottom surface of the attachment hole portion 15 to position the valve portion 20B.

In the water purifier 1, communication relationships between the first flow passage P21, second flow passage P22, and third flow passage P23 of the water purification main body 20 and the inflow passage P11, purified water outflow passage P12, waste water outflow passage P13, and raw water outflow passage P14 vary in accordance with a rotation position of the water purification main body 20 relative to the attachment main body 10. In FIGS. 2 and 3 used in the preceding description, the attachment main body 10 and the water purification main body 20 are set in a rotation position corresponding to the water purification mode. In this case, the first flow passage opening 21A and the second flow passage opening 22A respectively oppose the inflow passage opening 11A and the purified water outflow passage opening 12A, and therefore the first flow passage P21 and the second flow passage P22 respectively communicate with the inflow passage P11 and the purified water outflow passage P12. In the water purification mode, raw water flows in through the inflow port 11, passes through the inflow passage P11, the first flow passage P21, and the communication hole 27a in the partition wall member 27, and is filtered into purified water by the first filter member 25. The purified water then passes through the communication hole 27c of the partition wall member 27, the second flow passage P22, and the purified water outflow passage P12, and flows out through the purified water outflow port 12. At this time, impurities contained in the raw water are trapped by and accumulate on the first flow passage P21 side of the first filter member 25. Note that the third flow passage P23 is not communicative, the fourth flow passage P24 communicates with the waste water outflow passage P13 but is not otherwise communicative, and the raw water outflow passage P14 is not communicative. Hence, no water passes (flows) through these passages. Further, even if air infiltrates through the waste water outflow passage P13 or the raw water outflow passage P14, the air is blocked midway and does not therefore affect the operation of the water purification mode.

Figure 6:
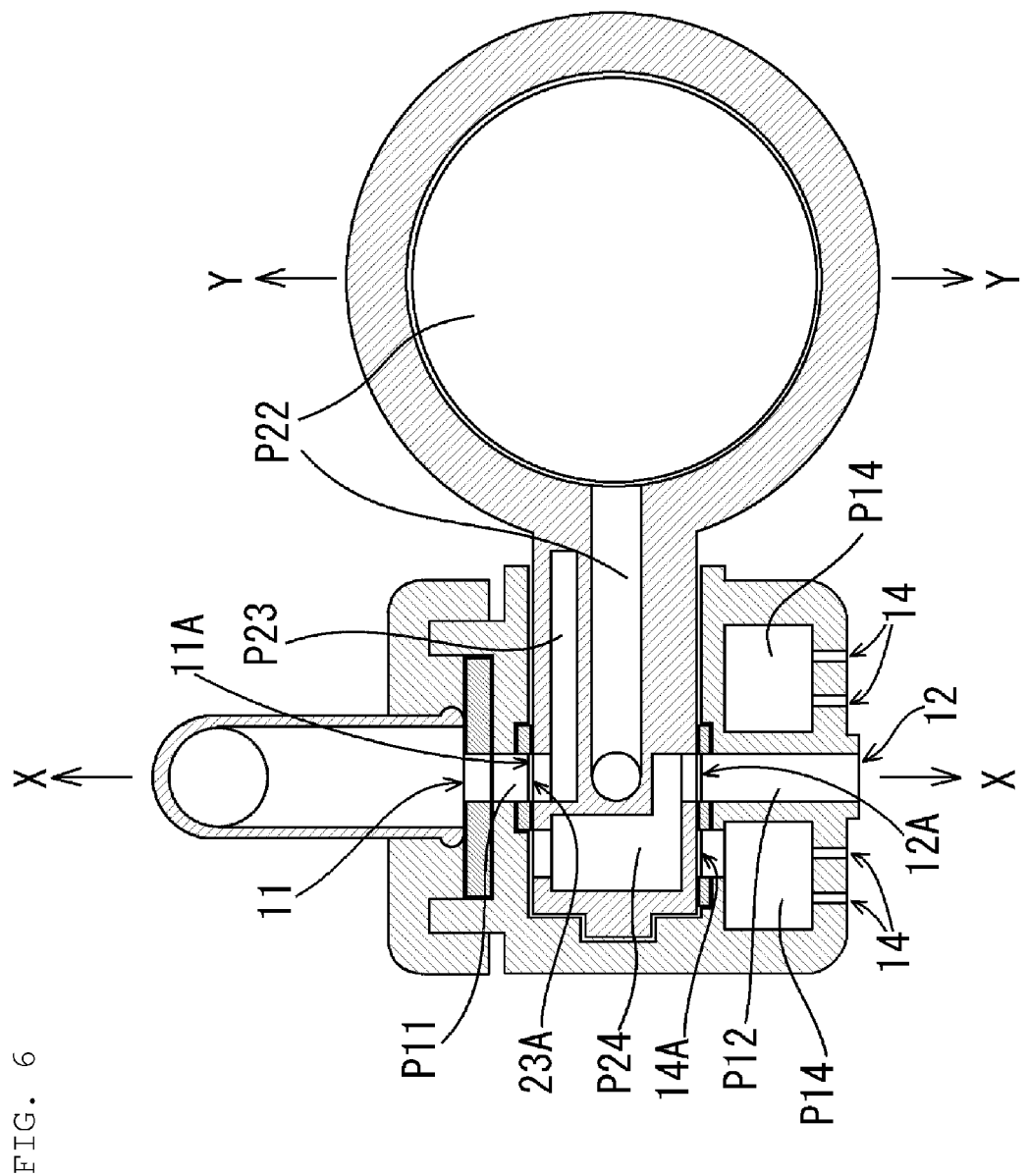
FIG. 6 is a front sectional view showing the water purifier 1 in the back washing mode.
Figure 7:
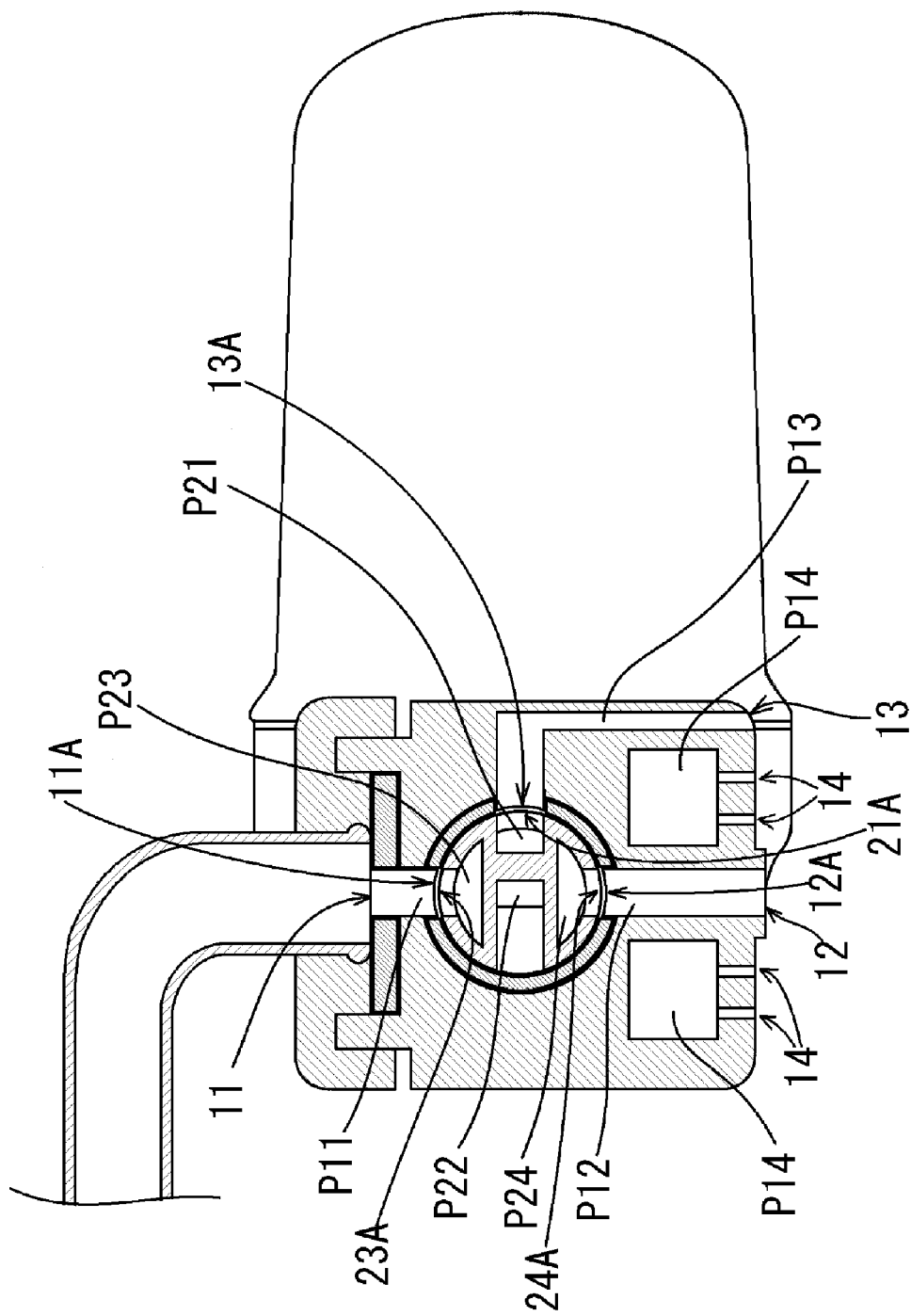
FIG. 7 is a left side sectional view taken in an X-X position in FIG. 6 and showing the water purifier 1 in the back washing mode.
Figure 8:
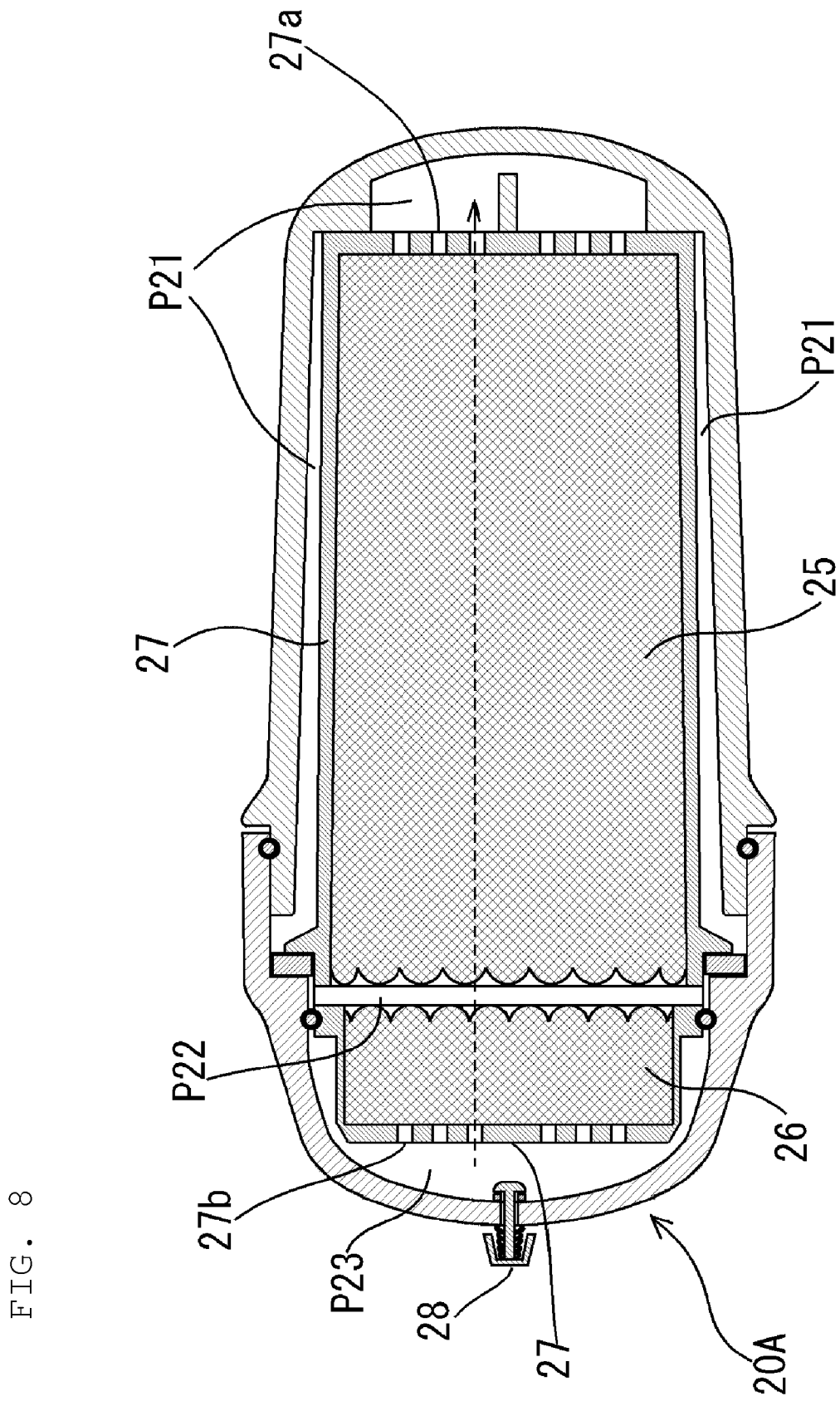
FIG. 8 is a left side sectional view taken in a Y-Y position in FIG. 6 and showing the water purifier 1 in the back washing mode.

FIGS. 6 and 7 show the attachment main body 10 and the water purification main body 20 in a rotation position corresponding to the back washing mode. In this case, the third flow passage opening 23A and the first flow passage opening 21A respectively oppose the inflow passage opening 11A and the waste water outflow passage opening 13A, and therefore the third flow passage P23 and the first flow passage P21 respectively communicate with the inflow passage P11 and the waste water outflow passage P13. In the back washing mode, raw water flows in through the inflow port 11 and passes through the inflow passage P11 and the third flow passage P23. Then, as shown by a broken line in FIG. 8, the raw water passes from the third flow passage P23 of the water purification portion 20A through the communication hole 27b in the partition wall member 27 and is filtered into purified water by the second filter member 26. The purified water then passes through the first filter member 25 in an opposite direction to the water purification mode to form water containing the impurities accumulated in the first filter member 25, or in other words waste water, whereupon the waste water passes through the communication hole 27a in the partition wall member 27 and the first flow passage P21. The waste water then passes from the first flow passage P21 of the valve portion 20B through the waste water outflow passage P13, and flows out through the waste water outflow port 13. Since the purified water flows laterally through the second flow passage P22 provided between the first filter member 25 and the second filter member 26, situations in which the impurities contained in the raw water become adhered to the second flow passage P22 or trapped on the second flow passage P22 side of the first filter member 25 do not arise. Hence, even if the raw water contains a large amount of impurities, the first filter member 25 can be back washed extremely effectively. Moreover, a complicated structure is not required. Note that since the second flow passage P22 is not communicative, the fourth flow passage P24 communicates with the purified water outflow passage P12 but is not otherwise communicative, and the raw water outflow passage P14 is not communicative, no water passes (flows) through these passages.

Figure 9:
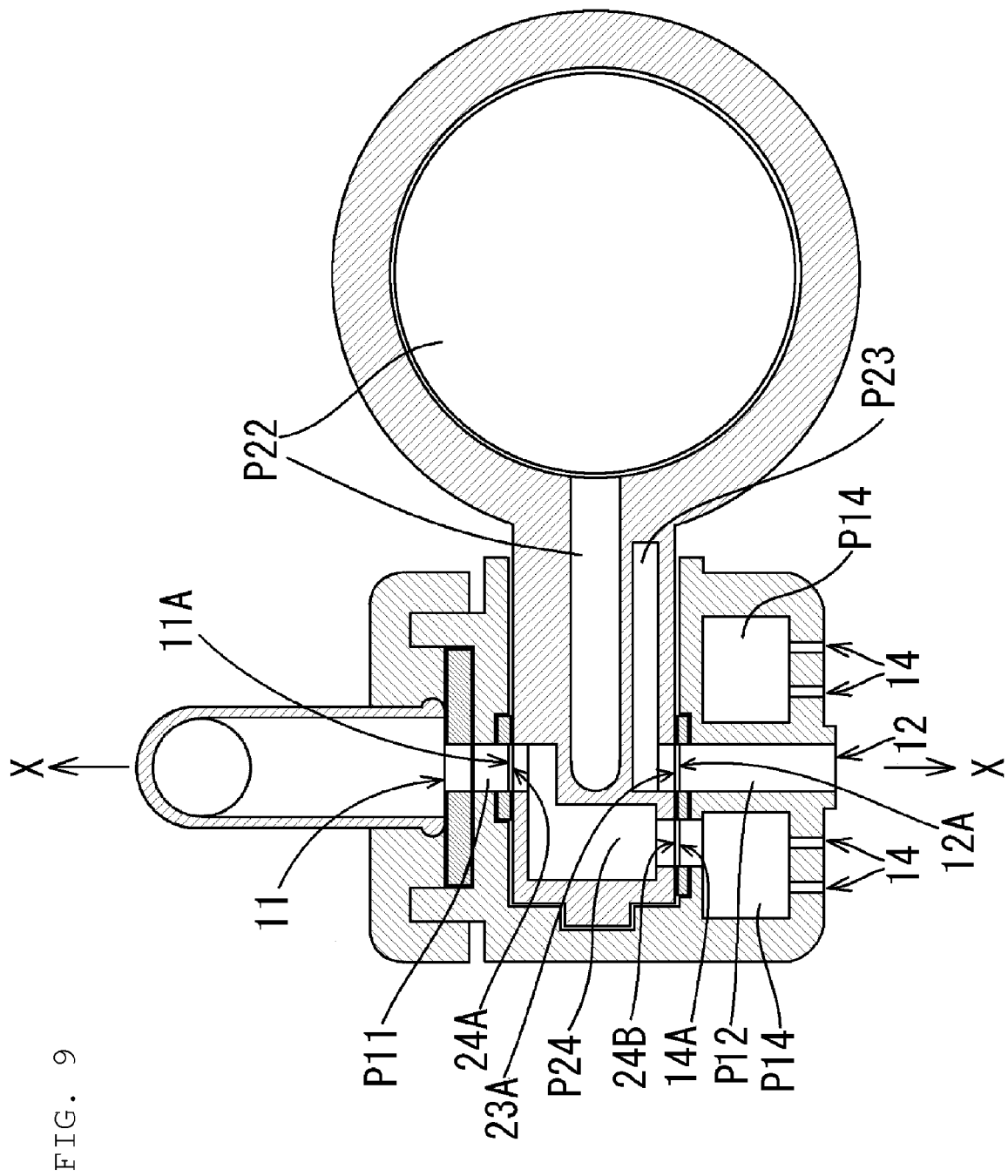
FIG. 9 is a front sectional view showing the water purifier 1 in the raw water mode.
Figure 10:
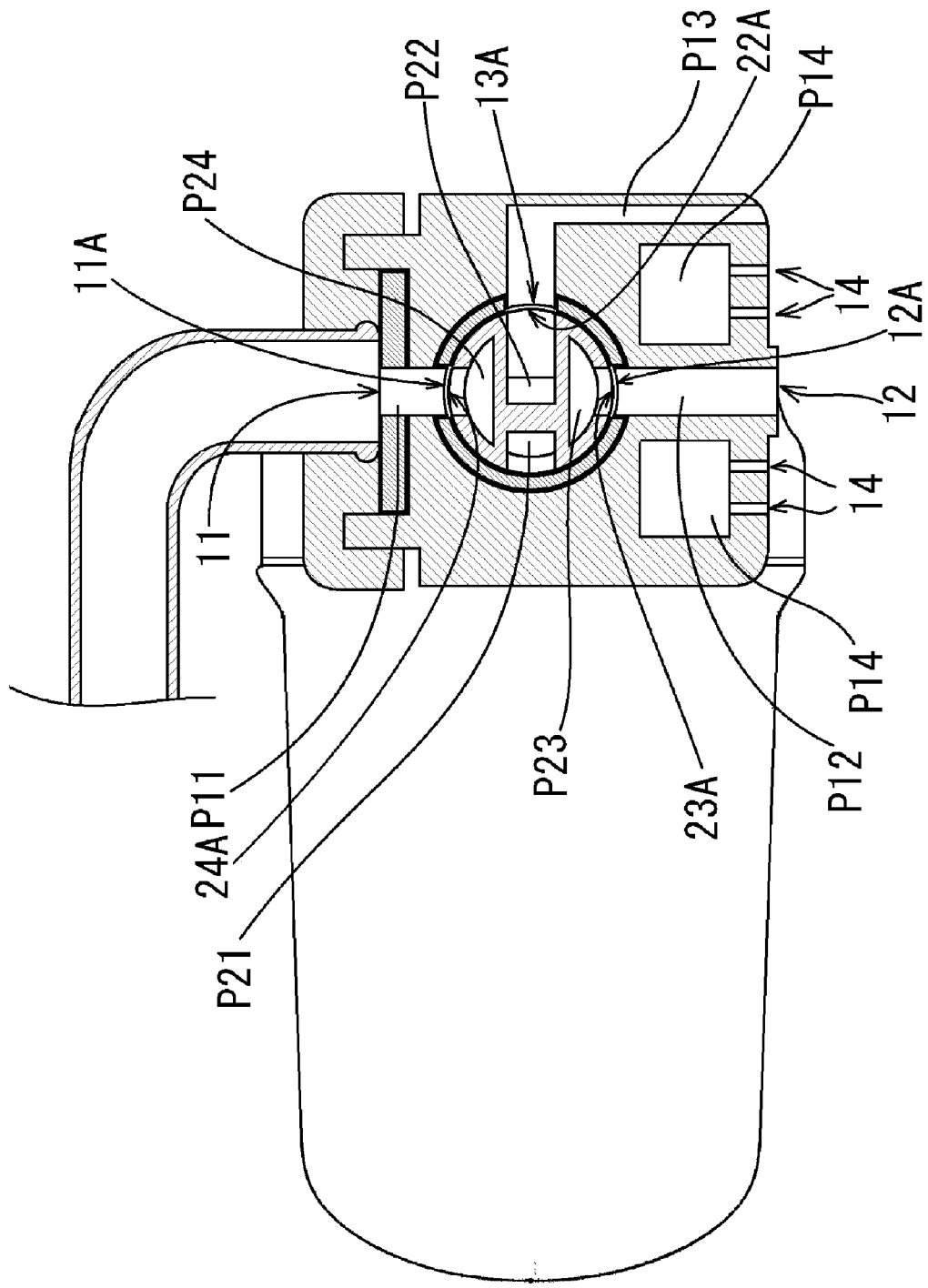
FIG. 10 is a left side sectional view taken in an X-X position in FIG. 9 and showing the water purifier 1 in the raw water mode.

FIGS. 9 and 10 show the attachment main body 10 and the water purification main body 20 in a rotation position corresponding to the raw water mode. In the raw water mode, the first fourth flow passage opening 24A and the second fourth flow passage opening 24B respectively oppose the inflow passage opening 11A and the raw water outflow passage opening 14A, and therefore the inflow passage P11 communicates directly with the raw water outflow passage P14 via the fourth flow passage P24. The rotation position of the raw water mode is in an opposite direction to a direction of the rotation position of the back washing mode relative to the rotation position of the water purification mode. In this preferred embodiment, the rotation position corresponding to the back washing mode is 90 degrees clockwise (from the left side) relative to the rotation position corresponding to the water purification mode, and therefore the rotation position corresponding to the raw water mode is 90 degrees counterclockwise (from the left side) relative to the rotation position corresponding to the water purification mode. Note that the specific angular intervals are not limited to 90 degrees and may be determined in accordance with specifications within a range that is smaller than 180 degrees. In the raw water mode, raw water flows in through the inflow port 11, passes through the fourth flow passage P24 and the raw water outflow passage P14, and then flows out through the raw water outflow port 14. Note that since the first flow passage P21 is not communicative, the second flow passage P22 communicates with the waste water outflow passage P13 but is not otherwise communicative, and the third flow passage P23 communicates with the purified water outflow passage P12 but is not otherwise communicative, no water passes (flows) through these passages.

Figure 11:
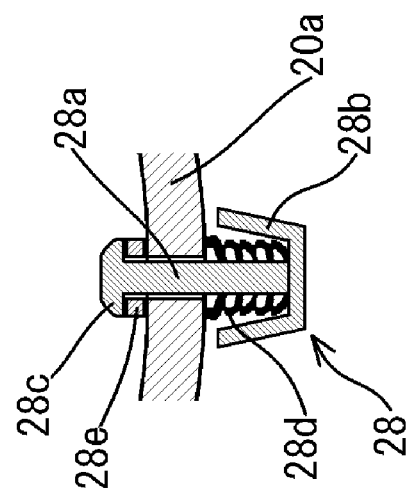
FIG. 11 is an enlarged front sectional view showing a drain purge valve 28 of the water purifier 1.
Figure 12:
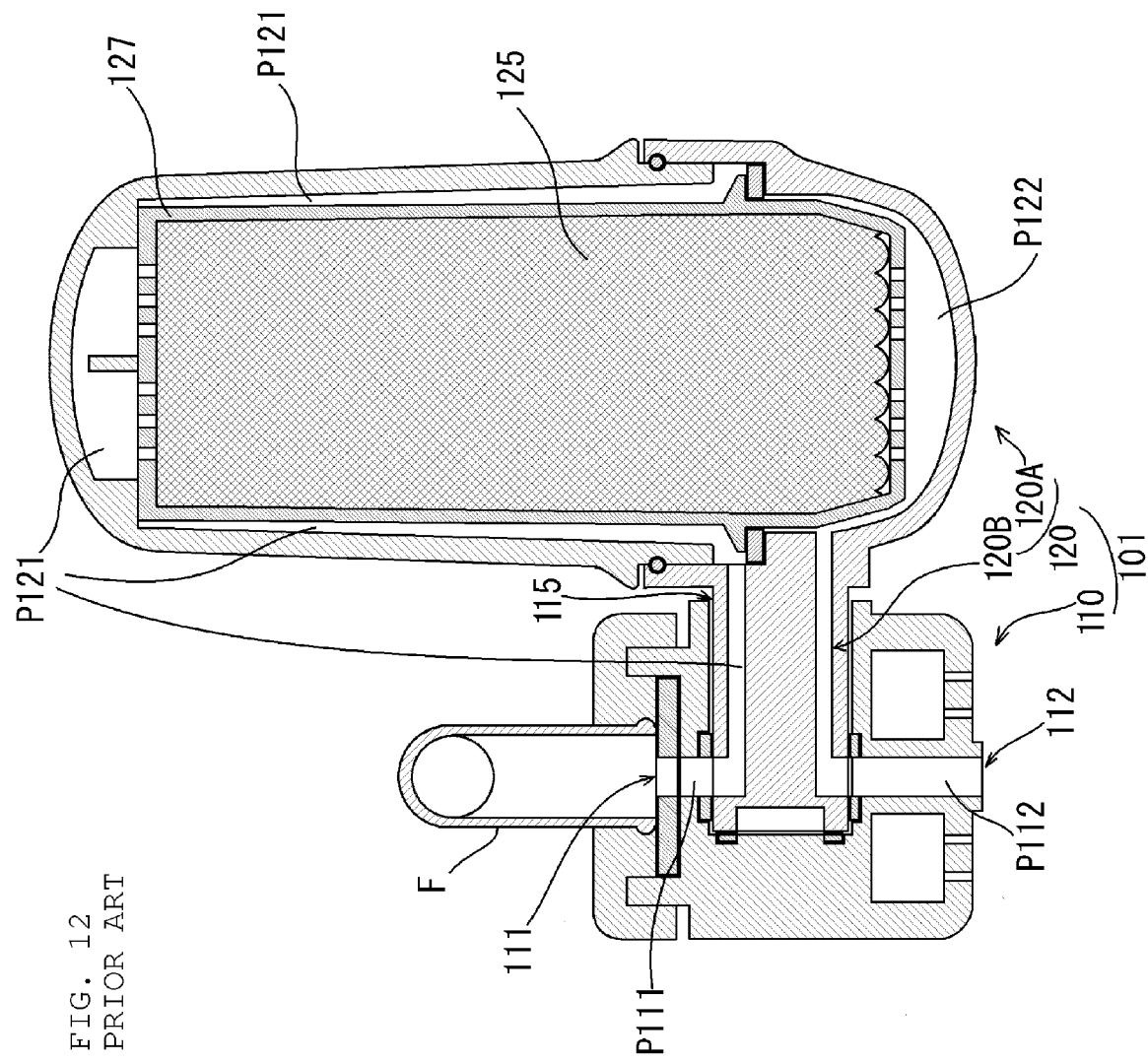
FIG. 12 is a front sectional view showing a conventional water purifier 101.

Hence, by rotating the water purification main body 20 relative to the attachment main body 10, the water purifier 1 can be switched between the water purification mode, the back washing mode, and the raw water mode. Here, water stored in the third flow passage P23 does not flow out to the outside in any mode, and therefore the drain purge valve (water purge valve) 28 (see FIG. 2) is provided so that the water in the third flow passage P23 can be discharged to the outside. The water stored in the third flow passage P23 is preferably purged periodically (every few months, for example). In the drain purge valve 28, as shown in FIG. 11, for example, a shaft portion 28a penetrates a through hole formed in the water purification main body base member 20a via a gap, end portions 28b, 28c having a predetermined shape (a closed-end substantially cylindrical shape and a substantially hemispherical shape) and a larger diameter than the shaft portion 28a are provided on either end of the shaft portion 28a, a spring 28d wound around the shaft portion 28a is provided between the exterior side end portion 28b and the water purification main body base member 20a, and a rubber packing member 28e is provided between the third flow passage P23 side end portion 28c and the water purification main body base member 20a. By pressing the exterior side end portion 28b, water is discharged from the third flow passage P23 through the gap on the periphery of the shaft portion 28a.

The water purifier 1 according to this preferred embodiment of the present invention was described above. However, the present invention is not limited to the above preferred embodiment and may be subjected to various design modifications within the scope of the matter described in the claims. For example, the rotation directions of the back washing mode and the raw water mode may be switched by disposing the inflow passage opening 11A, waste water outflow passage opening 13A, and purified water outflow passage opening 12A counter-clockwise (from the left side) in that order and disposing the first flow passage opening 21A, third flow passage opening 23A, second flow passage opening 22A, and first fourth flow passage opening 24A clockwise (from the left side) in that order. Further, the raw water outflow port 14 may be formed from a single hole such that raw water does not flow out in a shower in the raw water mode. Furthermore, depending on the specifications of the water purifier, the raw water mode need not be provided, and in this case, the raw water outflow port 14, raw water outflow passage (third outflow passage) P14, and fourth flow passage P24 may be omitted. Moreover, in certain cases, the waste water outflow port 13 may be omitted by connecting the waste water outflow passage (second outflow passage) P13 to the purified water outflow passage (first outflow passage) P12, although this is not preferable due to the likelihood of an increase in the amount of impurities adhering to the purified water outflow passage P12.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A water purifier comprising:
    an attachment main body that is attached to a bibcock of a water line and includes an inflow port, at least one outflow port, an inflow passage into which raw water from said inflow port flows, and first and second outflow passages through each of which water flows toward one of said at least one outflow port; and
    a water purification main body that is attached rotatably to said attachment main body and includes a first flow passage, a second flow passage, and a third flow passage, a first filter member disposed between said first flow passage and said second flow passage and a second filter member disposed between said second flow passage and said third flow passage; wherein
    when said attachment main body and said water purification main body are in a rotation position corresponding to a water purification mode, said first flow passage and said second flow passage communicate with said inflow passage and said first outflow passage, respectively, whereby water flows in a direction of said first flow passage, said first filter member, and said second flow passage such that purified water flows out through one of said at least one outflow port, and when said attachment main body and said water purification main body are in a rotation position corresponding to a back washing mode, said third flow passage and said first flow passage communicate with said inflow passage and said second outflow passage, respectively, whereby water flows in a direction of said third flow passage, said second filter member, said second flow passage, said first filter member, and said first flow passage such that water used for back washing flows out through one of said at least one outflow port.

2. The water purifier according to claim 1, wherein
    an attachment hole portion is provided in said attachment main body as a recess;
    a valve portion is provided on said water purification main body as a projection, respective opening portions of said first flow passage, said third flow passage, and said second flow passage being provided in a side surface of said valve portion in that order; and
    said valve portion is inserted into said attachment hole portion and attached thereto rotatably.

3. The water purifier according to claim 2, wherein a purified water outflow port and a waste water outflow port are included in said at least one outflow port, and when said attachment main body and said water purification main body are in the rotation position corresponding to the water purification mode, purified water flows out through the purified water outflow port, and when said attachment main body and said water purification main body are in the rotation position corresponding to the back washing mode, water used for back washing flows out through the waste water outflow port.

4. The water purifier according to claim 2, wherein
    said attachment main body comprises a third outflow passage;
    said water purification main body comprises a fourth flow passage, respective opening portions of said first flow passage, said third flow passage, said second flow passage, and said fourth flow passage being provided in said side surface of said valve portion in that order; and
    when said attachment main body and said water purification main body are in a rotation position corresponding to a raw water mode, which is in an opposite direction to a direction of said rotation position of said back washing mode relative to said rotation position of said water purification mode, said inflow passage communicates with said third outflow passage via said fourth flow passage.

5. The water purifier according to claim 4, wherein a raw water outflow port is included in said at least one outflow port, and when said attachment main body and said water purification main body are in the rotation position corresponding to the raw water mode, raw water flows out through the raw water outflow port.

6. The water purifier according to claim 2, wherein a drain purge valve capable of discharging water in said third flow passage to the outside is provided in said water purification main body.

7. The water purifier according to claim 1, wherein a purified water outflow port and a waste water outflow port are included in said at least one outflow port, and when said attachment main body and said water purification main body are in the rotation position corresponding to the water purification mode, purified water flows out through the purified water outflow port, and when said attachment main body and said water purification main body are in the rotation position corresponding to the back washing mode, water used for back washing flows out through the waste water outflow port.

8. The water purifier according to claim 7, wherein
    said attachment main body comprises a third outflow passage;
    said water purification main body comprises a fourth flow passage, respective opening portions of said first flow passage, said third flow passage, said second flow passage, and said fourth flow passage being provided in said side surface of said valve portion in that order; and when said attachment main body and said water purification main body are in a rotation position corresponding to a raw water mode, which is in an opposite direction to a direction of said rotation position of said back washing mode relative to said rotation position of said water purification mode, said inflow passage communicates with said third outflow passage via said fourth flow passage.

9. The water purifier according to claim 8, wherein a raw water outflow port is included in said at least one outflow port, and when said attachment main body and said water purification main body are in the rotation position corresponding to the raw water mode, raw water flows out through the raw water outflow port.

10. The water purifier according to claim 7, wherein a drain purge valve capable of discharging water in said third flow passage to the outside is provided in said water purification main body.

11. The water purifier according to claim 1, wherein said attachment main body comprises a third outflow passage;

said water purification main body comprises a fourth flow passage, respective opening portions of said first flow passage, said third flow passage, said second flow passage, and said fourth flow passage being provided in said side surface of said valve portion in that order; and when said attachment main body and said water purification main body are in a rotation position corresponding to a raw water mode, which is in an opposite direction to a direction of said rotation position of said back washing mode relative to said rotation position of said water purification mode, said inflow passage communicates with said third outflow passage via said fourth flow passage.

12. The water purifier according to claim 11, wherein a raw water outflow port is included in said at least one outflow port, and when said attachment main body and said water purification main body are in the rotation position corresponding to the raw water mode, raw water flows out through the raw water outflow port.

13. The water purifier according to claim 12, wherein a drain purge valve capable of discharging water in said third flow passage to the outside is provided in said water purification main body.

14. The water purifier according to claim 11, wherein a drain purge valve capable of discharging water in said third flow passage to the outside is provided in said water purification main body.

15. The water purifier according to claim 1, wherein a drain purge valve capable of discharging water in said third flow passage to the outside is provided in said water purification main body.

* * * * *